United States Patent
Schai et al.

(10) Patent No.: US 11,215,496 B2
(45) Date of Patent: Jan. 4, 2022

(54) ELECTROMECHANICAL ACTUATOR FOR A BULK-GOODS SHUT-OFF ELEMENT

(71) Applicant: BÜHLER AG, Uzwil (CH)

(72) Inventors: Peter Schai, Uzwil (CH); René Haid, Oberuzwil (CH); Andreas Kleiner, Niederhelfenschwil (CH); Heinz Brand, St. Gallen (CH)

(73) Assignee: BÜHLER AG, Uzwil (CH)

( * ) Notice: Subject to any disclaimer, the term of this patent is extended or adjusted under 35 U.S.C. 154(b) by 0 days.

(21) Appl. No.: 16/320,694

(22) PCT Filed: Jul. 27, 2017

(86) PCT No.: PCT/EP2017/068992
§ 371 (c)(1),
(2) Date: Jan. 25, 2019

(87) PCT Pub. No.: WO2018/019930
PCT Pub. Date: Feb. 1, 2018

(65) Prior Publication Data
US 2019/0162583 A1    May 30, 2019

(30) Foreign Application Priority Data

Jul. 27, 2016   (EP) .................................. 16181512

(51) Int. Cl.
*G01G 17/06*    (2006.01)
*F16K 31/528*    (2006.01)
(Continued)

(52) U.S. Cl.
CPC ............. *G01G 17/06* (2013.01); *F16K 1/223* (2013.01); *F16K 31/04* (2013.01); *F16K 31/041* (2013.01);
(Continued)

(58) Field of Classification Search
CPC ...... G01G 13/003; G01G 13/18; G01G 17/06; F16K 1/223; F16K 31/04; F16K 31/041;
(Continued)

(56) References Cited

U.S. PATENT DOCUMENTS 3,074,427 A * 1/1963 Wheeler, Jr. ............. F16K 1/223
                                                    137/512.1
4,390,090 A    6/1983 Kossebau
(Continued)

FOREIGN PATENT DOCUMENTS

DE        36 19 231 C1      2/1988
DE        1715308 A1  * 10/2006 ............. G01G 13/02
(Continued)

OTHER PUBLICATIONS

European Office Action issued in corresponding European Patent Application No. 17 748 706.3 dated Oct. 25, 2019.
(Continued)

*Primary Examiner* — Matthew W Jellett
(74) *Attorney, Agent, or Firm* — Finch & Maloney, PLLC; Michael J. Bujold; Jay S. Franklin (57) ABSTRACT

An electromechanical actuating drive (1) for a bulk-goods shut-off element, comprising an electric motor (2) and a control and drive electronics unit (3) associated with the electric motor (2), wherein the electromechanical actuating drive (1) comprises a mechanism for storing energy.

15 Claims, 8 Drawing Sheets

(51) Int. Cl.
  *F16K 1/22*    (2006.01)
  *F16K 31/04*   (2006.01)
  *F16K 31/52*   (2006.01)
  *F16K 31/53*   (2006.01)
  *F16K 31/56*   (2006.01)
  *G01G 13/18*   (2006.01)

(52) U.S. Cl.
  CPC .......... *F16K 31/042* (2013.01); *F16K 31/043* (2013.01); *F16K 31/046* (2013.01); *F16K 31/521* (2013.01); *F16K 31/5282* (2013.01); *F16K 31/535* (2013.01); *F16K 31/563* (2013.01); *G01G 13/18* (2013.01); *Y10T 137/87483* (2015.04)

(58) Field of Classification Search
  CPC .... F16K 31/042; F16K 31/043; F16K 31/046; F16K 31/521; F16K 31/5282; F16K 31/535; F16K 31/563; Y10T 137/87483
  USPC ......... 251/129.01, 129.11, 129.12, 212, 279, 251/280, 288; 137/601.11
  See application file for complete search history.

(56) References Cited

U.S. PATENT DOCUMENTS

| | | | | |
|---|---|---|---|---|
| 4,658,857 | A * | 4/1987 | Ayres, Jr. | F16K 1/223 |
| | | | | 137/601.11 |
| 6,568,417 | B2 * | 5/2003 | Laney | F16K 1/221 |
| | | | | 137/15.25 |
| 7,011,292 | B1 * | 3/2006 | Hill | B65B 39/003 |
| | | | | 137/601.11 |
| 7,681,539 | B2 * | 3/2010 | Wineland | F02M 53/06 |
| | | | | 123/445 |
| 8,636,262 | B2 * | 1/2014 | Schade | F16K 31/047 |
| | | | | 251/129.19 |
| 8,887,761 | B2 * | 11/2014 | Yokoyama | F16K 1/223 |
| | | | | 137/601.11 |
| 9,266,628 | B2 * | 2/2016 | Kleiner | B65B 1/12 |
| 9,575,474 | B2 | 2/2017 | Newerla et al. | |
| 9,634,541 | B2 * | 4/2017 | Jackson | F16D 49/04 |
| 9,797,517 | B2 * | 10/2017 | Rempp | F16K 31/04 |
| 9,909,679 | B2 * | 3/2018 | Turnaus | F15B 21/02 |
| 2003/0178004 | A1 * | 9/2003 | Keefover | F02D 9/107 |
| | | | | 123/399 |
| 2007/0035134 | A1 * | 2/2007 | Bristow, Jr. | F03G 3/06 |
| | | | | 290/1 R |
| 2011/0198404 | A1 * | 8/2011 | Dropmann | F24F 13/082 |
| | | | | 236/49.3 |
| 2013/0234057 | A1 * | 9/2013 | Muller | F16K 31/04 |
| | | | | 251/129.11 |

FOREIGN PATENT DOCUMENTS

| | | |
|---|---|---|
| DE | 10 2012 012 515 A1 | 12/2013 |
| EP | 15 86 784 A1 | 10/2005 |
| EP | 17 15 309 A1 | 10/2006 |

OTHER PUBLICATIONS

Wolf-Dieter Roth, "Superkondensatoren als abnutzungsfreie Energiespeicher statt Akkumulatoren", http://www.all-electronics.de/superkondensatoren-als-abnutzungsfreie-energiespeicher-statt-akkumulatoren/, Apr. 22, 2017.

* cited by examiner

ELECTROMECHANICAL ACTUATOR FOR A BULK-GOODS SHUT-OFF ELEMENT

The invention concerns an electromechanical actuator for a bulk material shut-off element, a device for dosing and/or weighing bulk material with at least one such bulk material shut-off element and a method for operating an electromechanical actuator for a bulk material shut-off element.

From the state of the art, for example from EP 1 715 309 A1, actuators are known which are supplied with compressed air. Bulk material is discharged from a storage container into a load vessel which interacts with a load cell. When a desired bulk density is reached in the load vessel, a flap mechanism of the load vessel is actuated by means of the pneumatic actuator, and the load vessel is thus emptied.

A disadvantage of such known actuators is that they first of all require a compressed air connection. Furthermore, pneumatic actuators are very energy-intensive, since compressed air must first be generated and continuously provided, even if the pneumatic actuator is not activated. In addition, the devices are usually designed in such a way that the flap mechanism must be kept active or locked in the closing position, which in turn means constant application of compressed air to the actuators or the installation of brakes/locks. Furthermore, pneumatic actuators are not infinitely variable, but can only be operated reversibly between two stop positions.

It is therefore the problem of the invention to provide an actuator which avoids the disadvantages of the state of the art and in particular permits energy savings, enables fast and infinitely variable operation of bulk material shut-off elements, can be operated with low electrical currents and can deliver high torques during start-up.

The problem is solved with an electromechanical actuator and a method of operating an electromechanical actuator according to the independent claims.

The electromechanical actuator for a bulk material shut-off element comprises an electric motor and control and drive electronics assigned to the electric motor. The motor shaft of the electric motor is connected directly or indirectly to the shut-off element.

According to the present invention, the electromechanical actuator comprises means for storing energy.

In particular, the control and drive electronics comprise means for storing electrical energy.

Due to the means for storing energy, only a low current supply is necessary, as actuators for bulk material shut-off elements are not operated continuously but cyclically with operating pauses. Energy consumption can thus be reduced compared to pneumatic actuators. The power demand required for a short time when actuating the actuator is covered by the means for storing energy, which acts as a buffer to bridge the peak power demand. This means that no large cable cross-sections, which are usually very cost-intensive, are necessary for the supply of electrical power. Furthermore, the need for space- and cost-intensive transformers and rectifiers or converters is also eliminated. In addition, the electric motor can usually be operated at different angular positions of the drive shaft and thus allows a bulk material shut-off element to be operated at different positions.

If the electric motor is not operated, depending on the embodiment the control and drive electronics can ensure that the means for storing electrical energy are replenished.

The means for storing electrical energy are preferably designed as supercapacitors.

Supercapacitors are particularly suitable for the short-term provision of high currents. In addition, supercapacitors are virtually maintenance-free and have a longer service life than accumulators, for example.

In particular, the supercapacitors can deliver currents of 25 ampere. These currents allow fast and immediate operation of heavy shut-off elements, in particular. Desired operating times of shut-off elements often lie within a range of less than 0.5 seconds (from completely closed to open or vice versa).

The electric motor is preferably a direct current motor. A brushless DC motor is particularly preferred as electric motor.

DC motors with supercapacitors are particularly suitable for the purposes mentioned above. In addition, DC motors and in particular brushless DC motors can be operated step by step in both directions of rotation and can also be used as a power generator.

The electric motor is preferably a servo motor. A servo motor in the sense of the present invention means all electric motors which are equipped with a sensor for determining the position of the motor shaft. The sensor is connected to the control and drive electronics and allows both the angular position of the motor shaft and thus the position/condition of the shut-off element to be determined, as well as the desired angular position of the motor shaft to be reached and maintained and the desired position/condition of the shut-off element to be reached.

The electric motor is preferably designed to generate electrical energy.

The electrical energy generated by the electric motor is in particular fed into the means of storing electrical energy. The actuator is thus preferably designed in such a way that when the shut-off element is operated, the shut-off element itself is actuated at least partly during the movement by gravity and/or the influence of bulk material. Since then no electrical energy is required, the electric motor can be used as a generator. This further reduces the power consumption of the actuator, since electrical energy can be generated and reused without external supply.

Preferably, the actuator can be operated with a maximum current of 3 amperes.

Preferably the actuator is supplied with a voltage in the low current range, especially below 48 V, especially preferred between 22 and 28 V.

It is thus nevertheless possible to generate high power of the electric motor with low voltage and with the help of electric energy storage means (e.g. supercapacitors).

The actuator furthermore preferably comprises a gear unit. The gear unit is preferably designed as a compact gear unit, especially with a planetary gear unit. For special applications, the gear unit includes an angular gear unit.

Depending on the application, the actuator can thus be adapted. For example, depending on the gear ratio, very high torques or very precise positioning of the shut-off element are possible.

The control and drive electronics are preferably located directly at the electric motor. In particular, the control and drive electronics are located in a common housing with the electric motor and any other components present.

The actuator is preferably designed in such a way that a position of the shut-off element, in particular an extreme position (i.e. a position which is not exceeded by the shut-off element; e.g. a closing position or a release position) can be maintained when the electric motor is electroless (i.e. the electric motor is not supplied with electric power).

This means that no locking of the shut-off element is necessary, which normally extends the operating times, as the shut-off element must first be unlocked and then moved. Energy savings are thus also possible and the average power consumption of the actuator is further reduced.

The actuator preferably comprises a toggle joint which connects a motor or gear shaft directly or indirectly (i.e. via further components) to the shut-off element, a dead position of the toggle joint being designed in such a way that a position of the shut-off element can be maintained when the electric motor is electroless.

In particular, the position of the shut-off element can be maintained when the electric motor is electroless due to the own weight of the shut-off element and/or when bulk material is accumulated upstream of the shut-off element.

The toggle joint preferably comprises a first lever with an eccentrically arranged or arrangeable first stub shaft, which first lever is rotatably mounted on a motor or gear shaft, and a coupling rod, which is rotatably mounted on the first stub shaft. The toggle joint also comprises a second lever with an eccentrically arranged or arrangeable second stub shaft, which second lever is rotatably mounted or mountable about the pivot axis of a pivotable shut-off element and on the first stub shaft. The coupling rod, which is rotatably mounted on the first stub shaft and the second stub shaft, respectively, thus couples the first lever with the second lever.

If no pivoting shut-off element is used, the second lever can be in operative connection with the shut-off element (e.g. a slidable shut-off plate) or can be brought into operative connection with the shut-off element.

Due to the toggle joint, a transmission of sufficiently large torques/forces is thus possible, so that the shut-off element can be moved quickly.

The actuator according to the invention is preferably used for a material scale. The shut-off element is then preferably designed as a pivoting flap and is operatively connected to at least one load cell, so that a weight of accumulated bulk material can be determined with the flap in a closed position. When the desired weight is reached, the flap is brought into a release position via a control system. Upstream of the flap there may be a metering element which can adjust the quantity of bulk material which reaches the flap, so that, for example, when the desired weight is reached and shortly before the flap is pivoted into the release position, the flow of bulk material is interrupted so that only the weighed quantity of bulk material can be discharged.

The invention further concerns a device for dosing and/or weighing bulk material, comprising at least one bulk material shutoff element which can be operated by at least one electromechanical actuator as described above.

In particular, the operation of the bulk material shut-off element comprises the opening and/or closing thereof.

The preferred embodiments and developments described above for the electromechanical actuator according to the present invention can therefore be applied to the device according to the present invention.

The device is preferably designed as a bulk material scale, wherein the bulk material shut-off element is designed as a pivotable flap.

The problem is also solved by a process for operating an electromechanical actuator for a bulk material shut-off element.

The electromechanical actuator is preferably an electromechanical actuator as described above.

The electromechanical actuator comprises an electric motor, control and drive electronics associated with the electric motor, and means for storing energy.

According to the invention, when the actuator is operated by the electric motor, energy is stored in the means for storing energy.

In particular, the operation of the bulk material shut-off element comprises an opening and/or closing of the same.

The control and drive electronics preferably comprise the means for storing energy, which are designed as means for storing electrical energy, wherein the energy is stored as electrical energy, preferably in supercapacitors of the control and drive electronics (3).

The invention is described below using a preferred embodiment in conjunction with the drawing. Therein it is shown.

Figure 1:
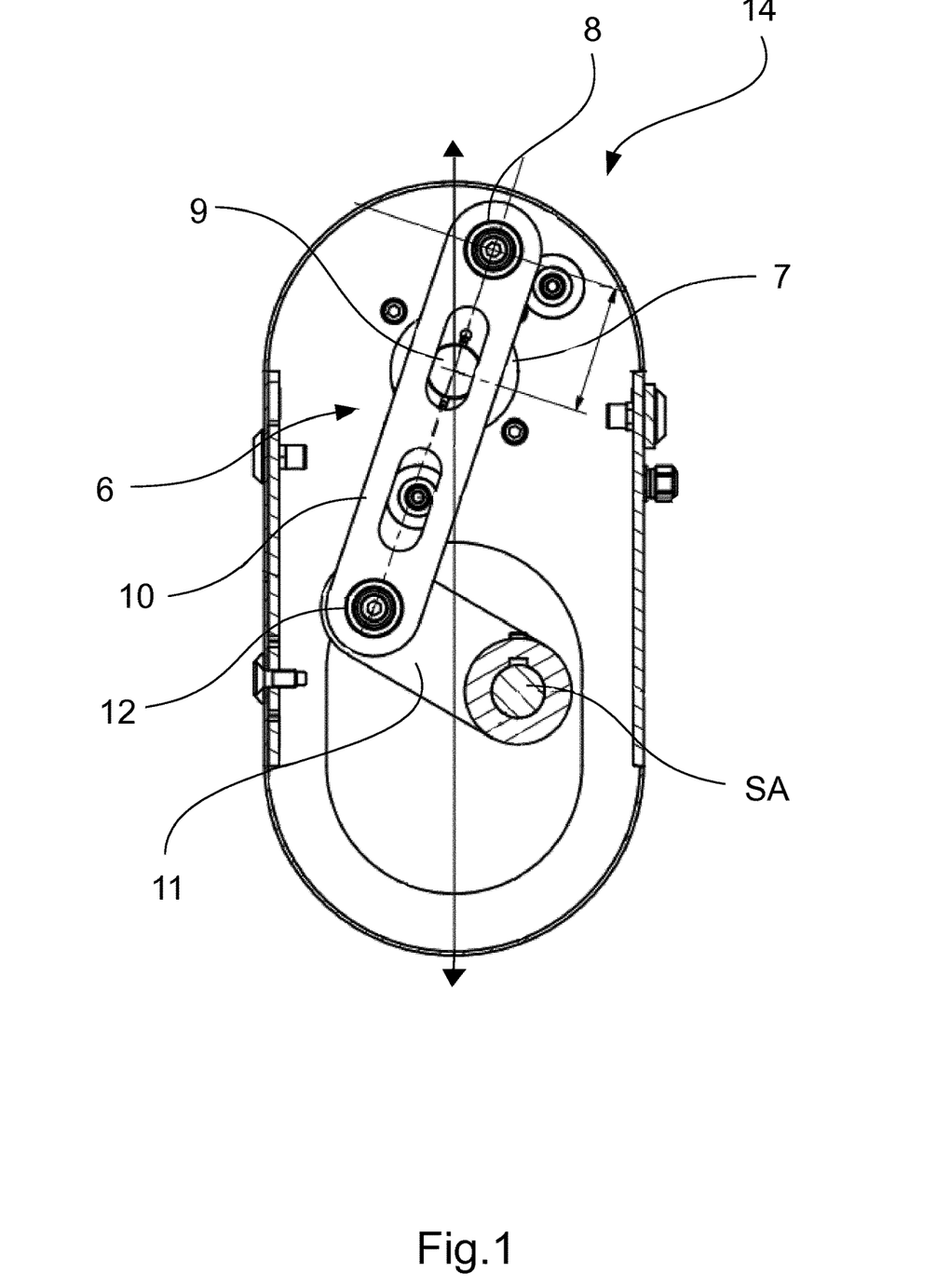
FIG. 1 a top view of an operating mechanism in the closing position.
Figure 2:
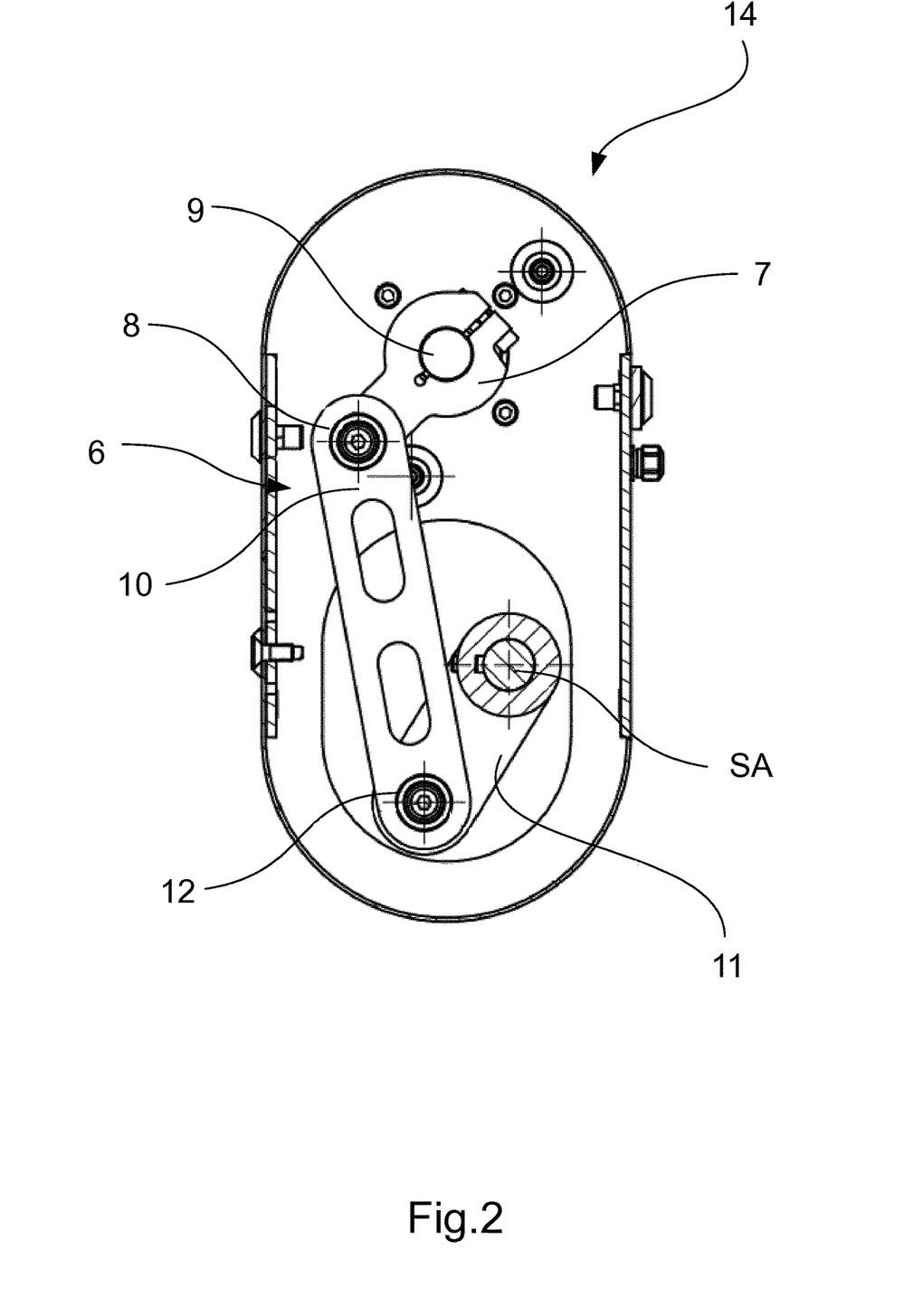
FIG. 2 a top view of an operating mechanism in the release position.

FIGS. 1 and 2 show the mechanism 14 with a toggle joint 6, the joint 6 being in a closed position S and a release position F, respectively.

Figure 3:
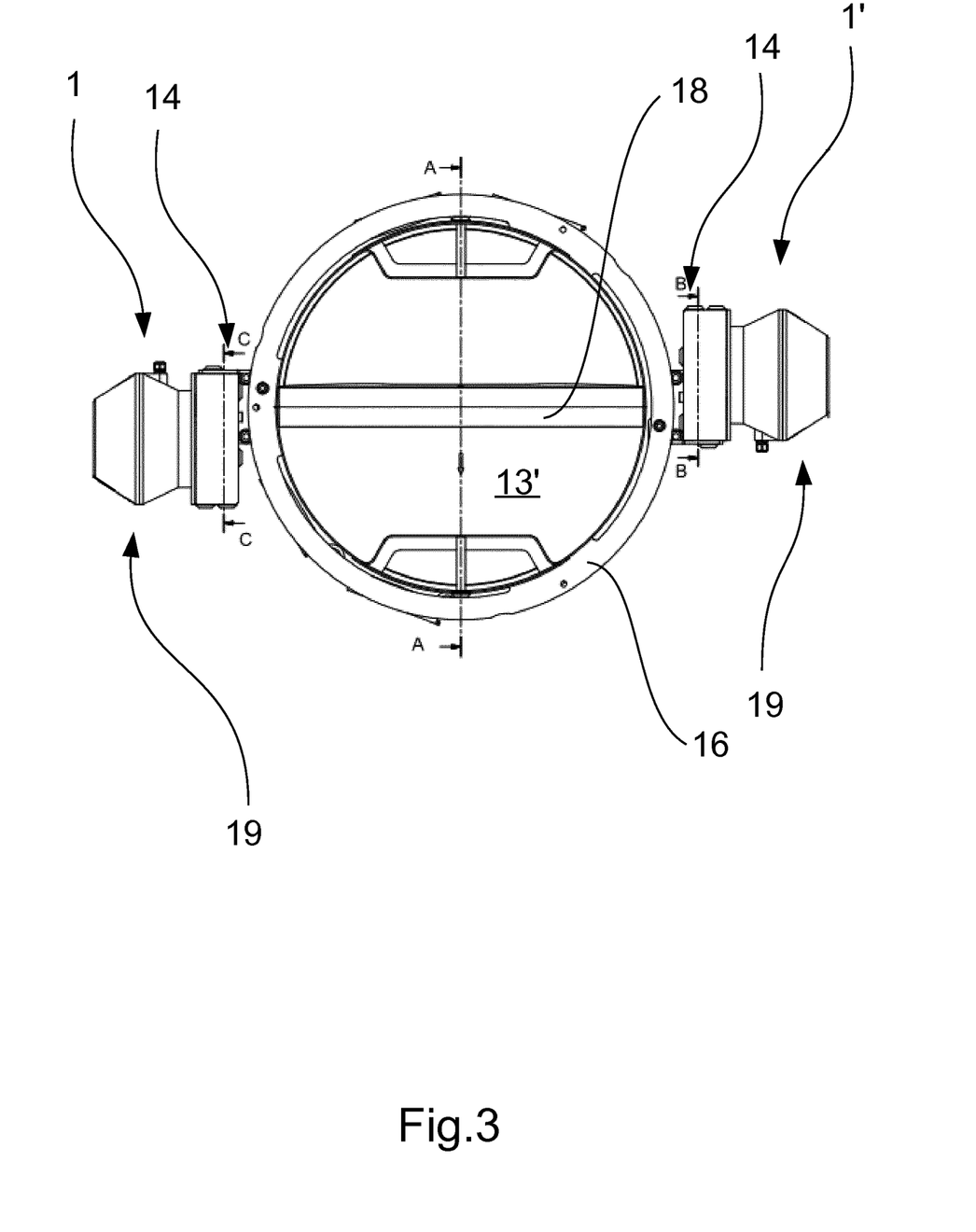
FIG. 3 a top view of a bulk material dosing device.
Figure 4:
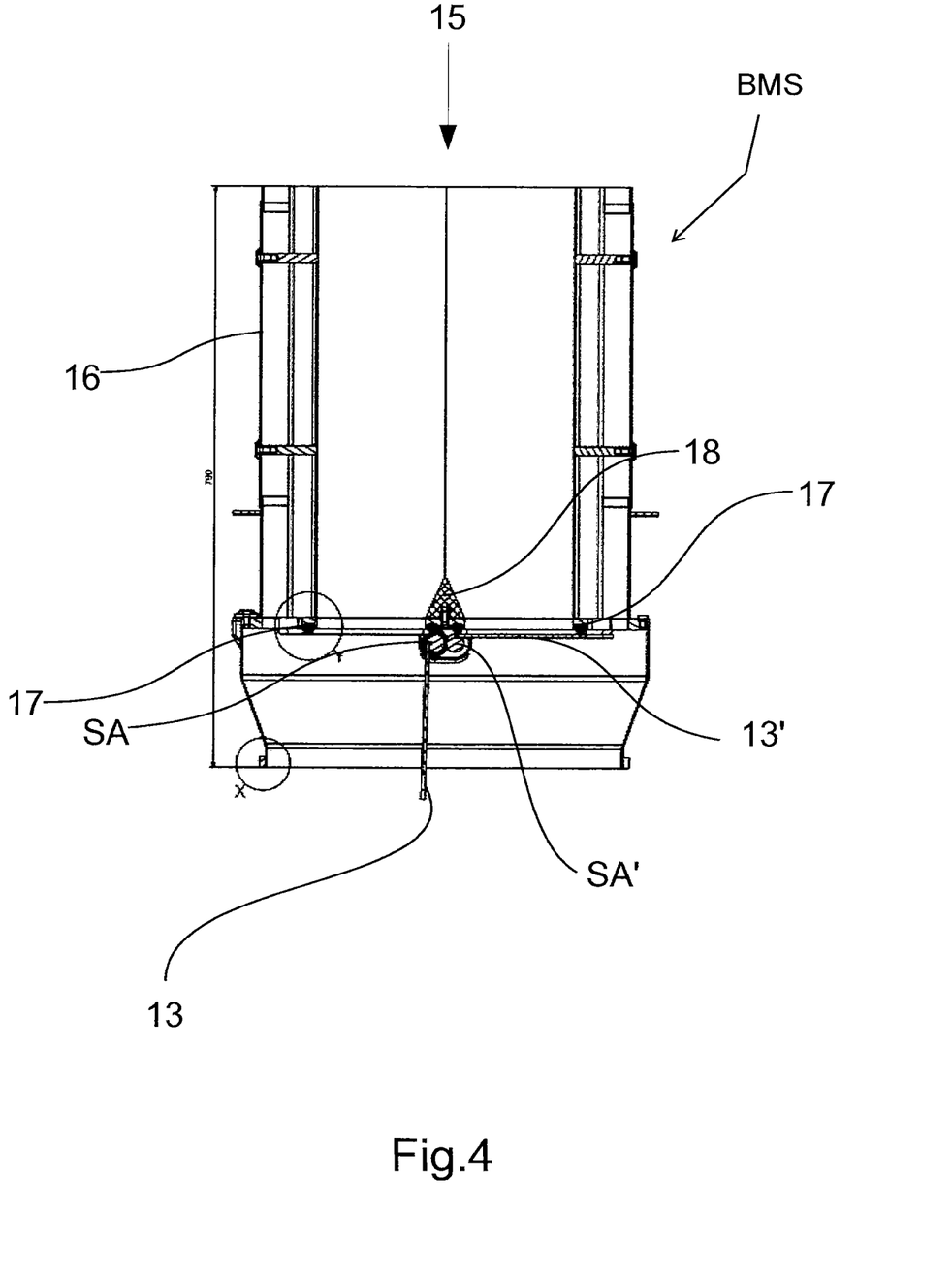
FIG. 4 a sectional view through the plane A-A of FIG. 3.

The joint 6 comprises a first lever 7 and a second lever 11, each of which is rotatably mounted on a gear shaft 9 of an actuator 1 shown in FIGS. 3 to 6 or on a pivot axis SA of a flap 13 (shown in FIG. 4).

First and second levers 7 and 11 each comprise an excentrically arranged stub shaft 8 and 12, respectively. Both stub shafts 8 and 12 are connected to each other via a coupling rod 10.

A rotation of the first lever 7 also causes a rotation of the second lever 11 via the coupling rod 10.

Figure 7:
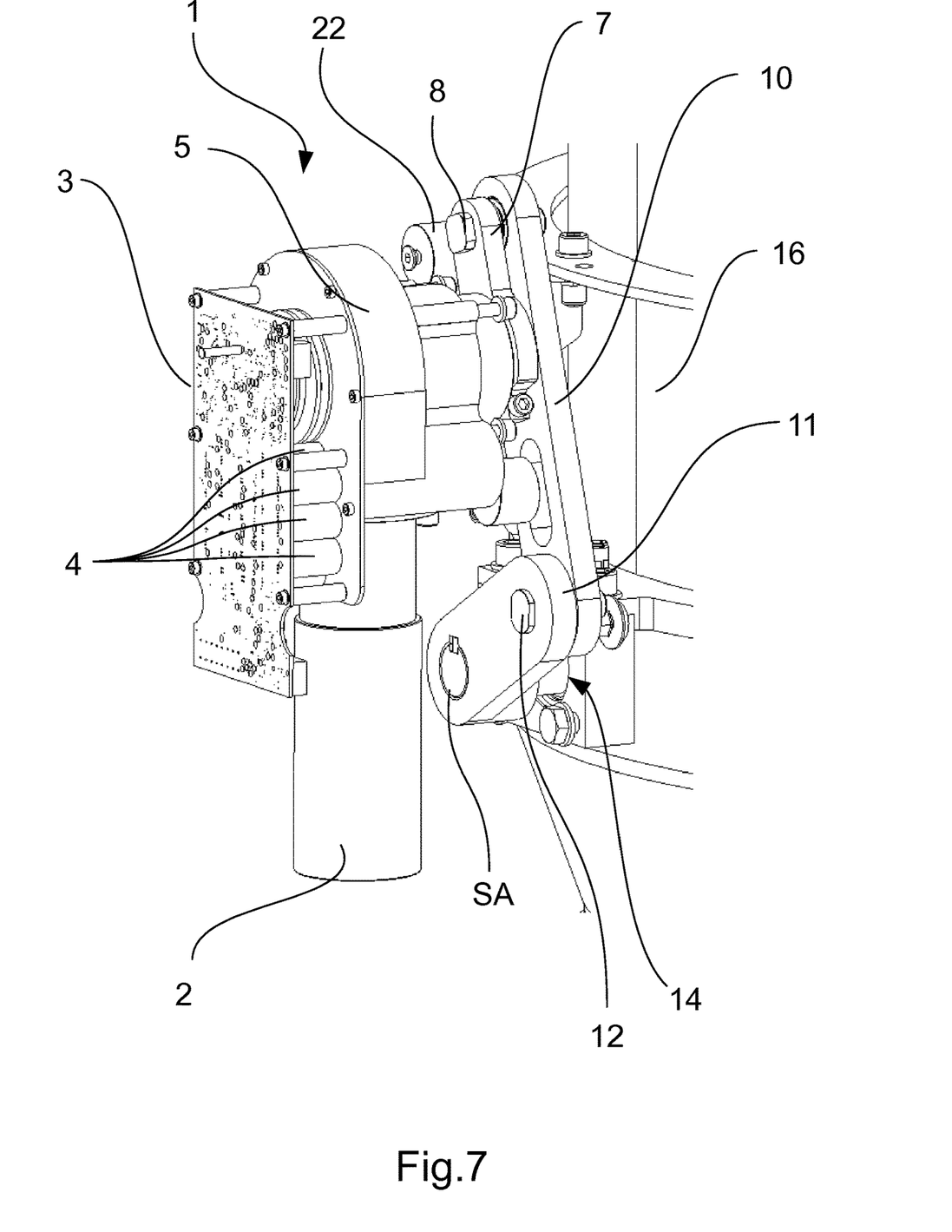
FIG. 7 the actuator of FIG. 5 without housing.

As shown in FIG. 1, the mechanism 14 is designed in such a way that in the closing position S the first lever 7 is turned beyond the top dead point and the coupling rod 10 rests against a stop element 22 (shown in FIG. 7).

Thus, torques occurring at the second lever 11 cannot cause a rotation of the first lever 7, since a further rotation of the first lever 7 is prevented by the stop element 22, which restricts movement, and the mechanism 14 thus acts in a self-locking manner. It is therefore not necessary to provide the joint 6 with an additional brake or locking device.

FIGS. 3 and 4 show a bulk material dosing device comprising two actuators 1 and 1' each with a mechanism 14. An actuator 1 or 1' comprises an electric motor 2 designed as a servo motor, control and drive electronics 3 with a plurality of supercapacitors 4 and a gear 5.

A flow direction of the bulk material is shown schematically with arrow 15. The bulk material dosing device is arranged in a housing 16, which can be arranged in a bulk material line or can be part of a bulk material line.

The bulk material dosing device comprises two flaps 13 and 13', which are each mounted around a swivel axis SA and SA', respectively. Flap 13 was pivoted downwardly and thus is in the so-called release position F. Flap 13' is in the closing position S and interacts with a seal 17 arranged on the housing 16 to interrupt the bulk material passage in flow direction 15.

Both swivel axes SA and SA' are arranged parallel and side by side. The flaps 13 and 13' can be pivoted downwardly in opposite directions.

Each flap 13 or 13' is pivoted by 90° between the closing position S and the release position F about the respective swivel axis SA or SA'. As shown in FIGS. 1 and 2, pivoting the flap 13 and 13' respectively corresponds to rotating the second lever 11 by 90° as well. However, due to the transmission ratio, the first lever 7 must be rotated by more than 90° in order to bring the flap 13 and 13', respectively, into the release position F.

In the region of the two swivel axles SA and SA' there is provided a deflector 18 with a triangular cross-section and an upwardly directed peak. The deflector body 18 prevents bulk material from reaching the region of swivel axes SA and SA'.

Figure 5:
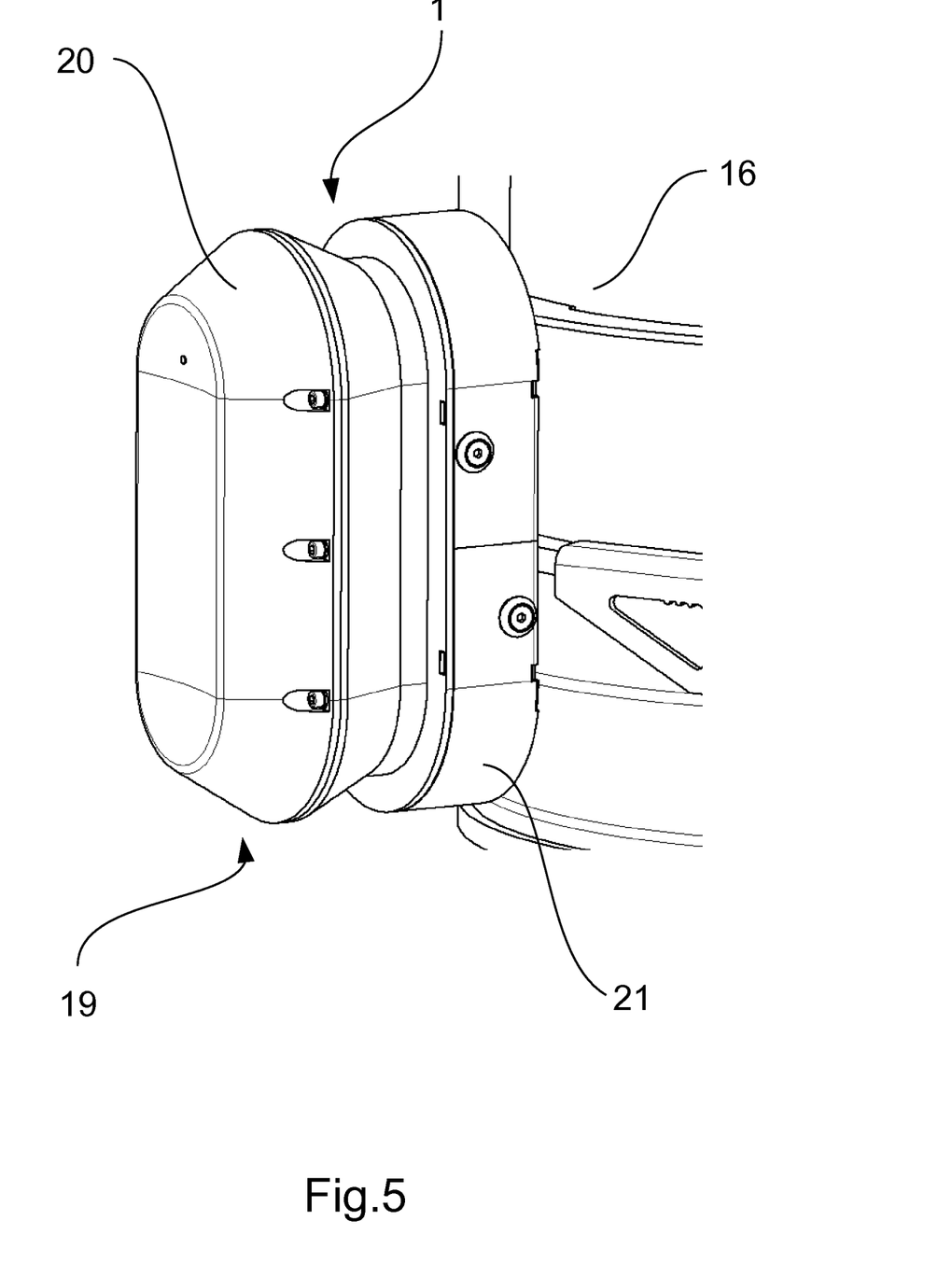
FIG. 5 a perspective view of an actuator.
Figure 6:
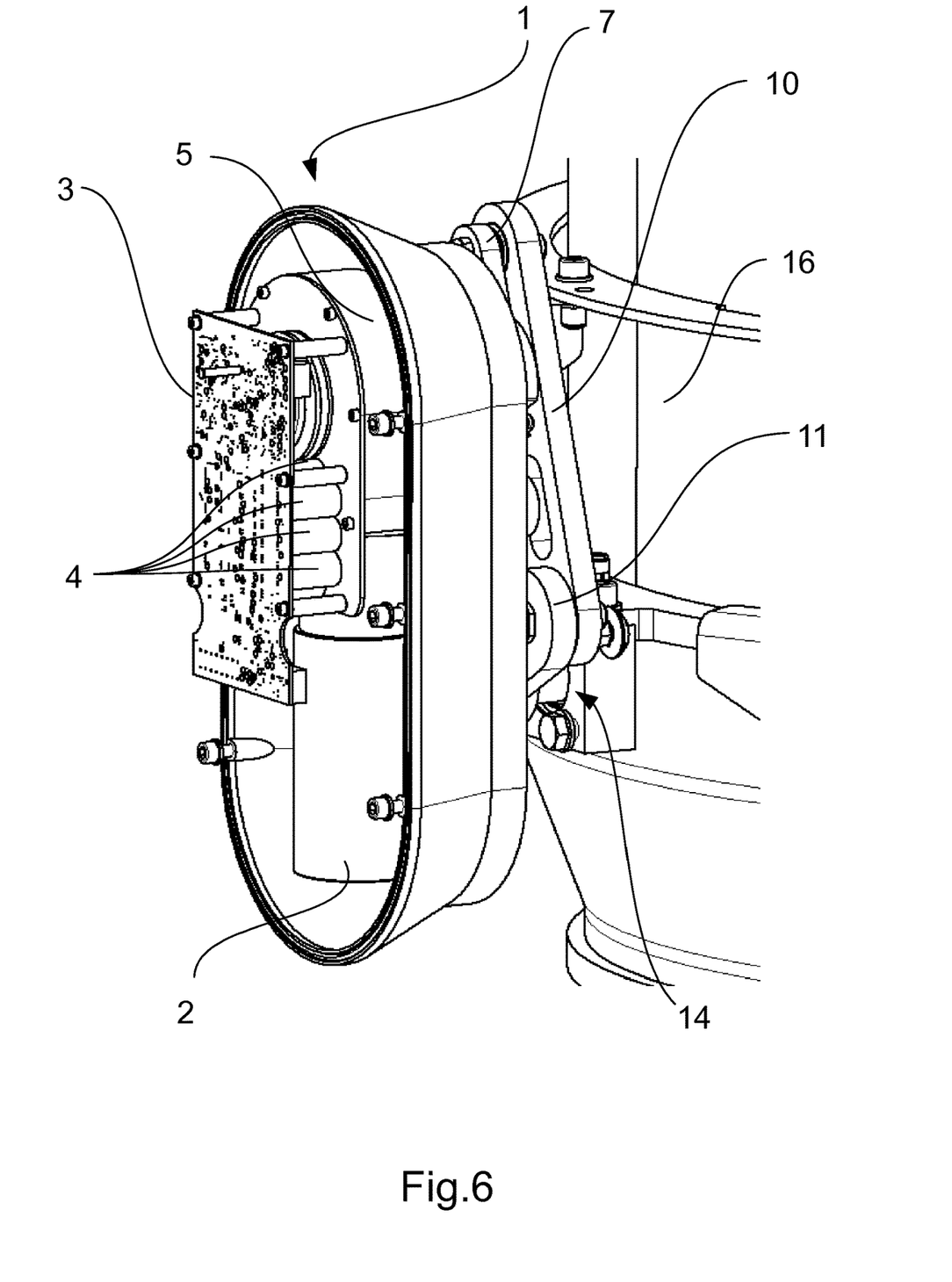
FIG. 6 the actuator of FIG. 5 without housing cover.

In FIGS. 5 to 7, the actuator 1 is shown in perspective view, in a housing 19, without a housing cover 20 and without a cover 21 for the mechanism 14, and without a housing 19, respectively.

The mechanism 14 of FIGS. 1 and 2 is visible in FIGS. 6 and 7 and is in the closing position S.

The arrangement of the electric motor 2 with an angular gear 5 is visible. The control and drive electronics 4 are directly attached to the electric motor-gear unit. The control and drive electronics 4 also include a plurality of supercapacitors 4. The entire actuator 1 is protected in the housing 19.

The supercapacitors 4, on the one hand, enable the recovering and storing of electrical energy, e.g. when flap 13 is pivoted into the release position F by gravity only.

Furthermore, the high power required for a short time when operating the shut-off device can be taken from the supercapacitors 4. This means that no high voltages are required to supply actuator 1. Large cable cross-sections are also not necessary.

Figure 8:
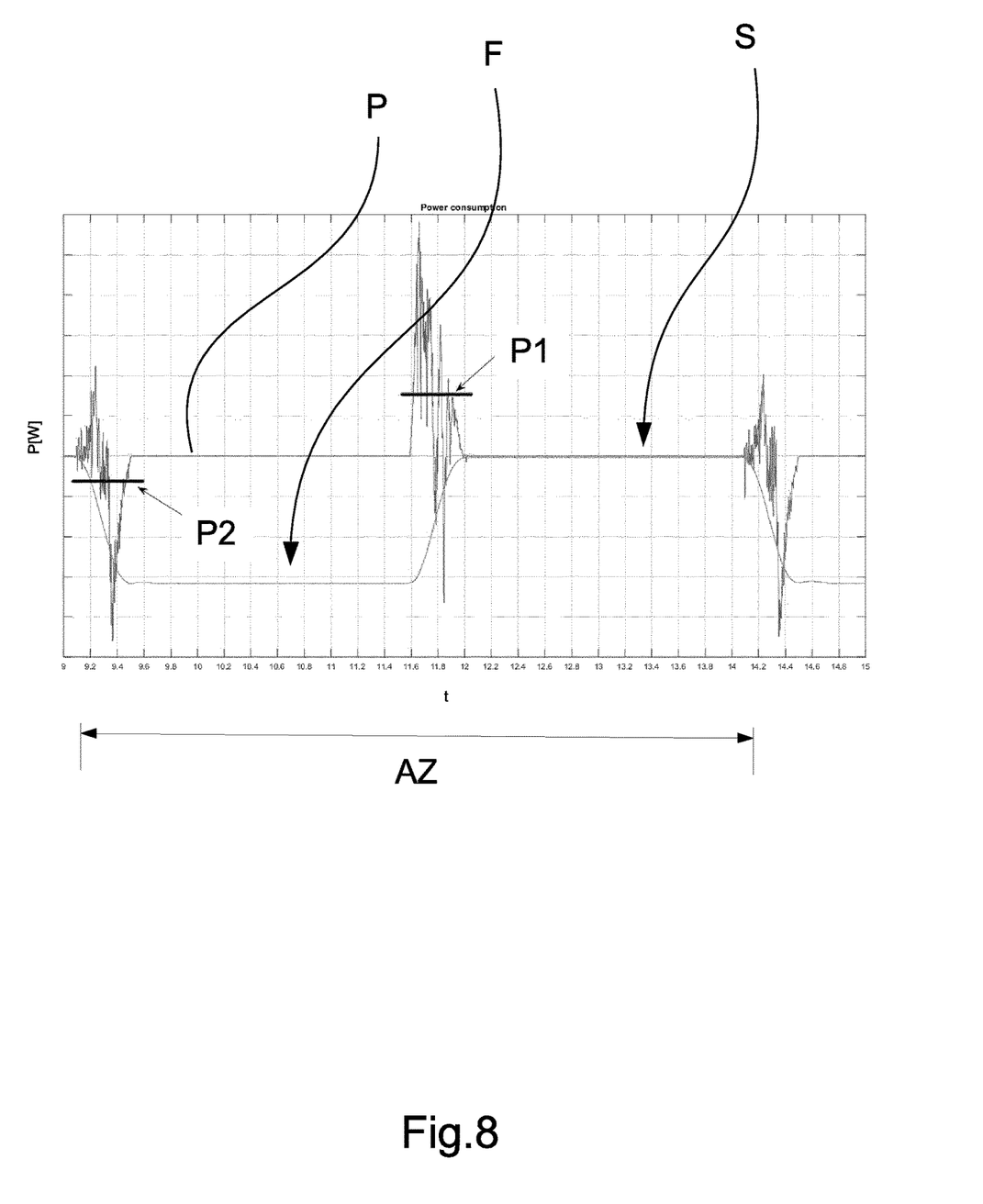
FIG. 8 a schematic diagram of the power consumption of an actuator.

FIG. 8 shows a schematic and exemplary sequence of an opening and closing process of a shut-off element according to the present invention, which is provided in the form of a flap, as described above.

The abscissa axis represents a dimensionless time, the ordinate axis shows the power consumed and generated by the actuator in watts without scale.

A line approximating a rectangular wave signal represents the position of the flap.

As can be seen from the course of line P, moving flap 13 into release position F first requires power in order to overcome the self-locking of mechanism 14 (first lever 7 must be moved above top dead point). This is indicated by a rise of the line P. However, since the flap 13 is opened by gravity alone after the first lever 7 has passed the top dead point, a negative power is generated which is perceivable by the drop of the line P. This means that the electric motor generates 2 power. As can be seen from FIG. 8, the net power generated by moving the flap 13 into the release position F is P2 (watts).

This power P2 is stored in the form of electrical energy in the supercapacitors 4 of actuator 1.

When pivoting the flap 13 into the closing position S, however, power is required, since the flap 13 must be moved against gravity. In FIG. 8, this can be perceived from the increase of the line P. According to FIG. 8, the net power required is P1 (Watt).

If the flap 13 is in the release position F or in the closing position S (horizontal course of the "rectangular signal"), no power is required (the electric motor 2 is electroless). This can be seen from the horizontal course of the line P.

Since the generated power is stored in the supercapacitors 4, it can be used when flap 13 is again pivoted into the closing position S. The net power required to operate actuator 1 is therefore P1-P2 (Watt) per opening and closing operation. However, since an opening and closing process takes only 10 to 20% of the time of a working cycle AZ and the electric motor 2 is otherwise electroless, very large energy savings are possible compared to state-of-the-art actuators.

The invention claimed is:

1. A device for dosing, or weighing, or dosing and weighing bulk material comprising at least one bulk material shut-off element, the bulk material shut-off element being operable by at least one electromechanical actuator, wherein the operation of the bulk material shut-off element is an opening or closing or opening and closing thereof, said bulk material shut-off element being a pivoting flap and being operatively connected to at least one load cell, so that a weight of accumulated bulk material can be determined with the flap in a closed position, and
wherein the electromechanical actuator comprises:
an electric motor,
control and drive electronics assigned to the electric motor, and the electromechanical actuator comprises capacitors, which are configured and arranged to act as a buffer that bridges peak power demand when actuating the actuator.

2. The device according to claim 1, wherein the capacitors are supercapacitors.

3. The device according to claim 1, wherein the electric motor is a direct current motor.

4. The device according to claim 3, wherein the direct current motor is a brushless direct current motor.

5. The device according to claim 1, wherein the electric motor is a servo motor.

6. The device according to claim 1, wherein the electric motor is configured for generating electrical energy.

7. The device according to claim 1, wherein the electromechanical actuator is operated with a maximum current of 3 amperes.

8. The device according to claim 1, wherein the electromechanical actuator further comprises a gear.

9. The device according to claim 8, wherein the gear is a compact gear.

10. The device according to claim 1, wherein the control and drive electronics are arranged directly on the electric motor.

11. The device according to claim 1, wherein the electromechanical actuator comprises a toggle joint which connects a motor or gear shaft to the shut-off element, and the toggle joint is configured in such a way that a dead point of the toggle joint enables a position of the shut-off element to be maintained when the electric motor has no electrical power supplied to it.

12. The device according to claim 11, wherein the toggle joint comprises:
a first lever with an eccentrically arranged first stub shaft, which first lever is rotatably mounted on a motor or gear shaft, and
a coupling rod, which is rotatably mounted on the first stub shaft, and the toggle joint further comprises a second lever with an eccentrically arranged second stub shaft, which second lever is rotatably mounted about the pivot axis of a pivotable shut-off member and on the first stub shaft.

13. The device according to claim 1, wherein the device is a bulk material scale and the bulk material shut-off element comprises a pivotable flap.

14. A method for operating a device in accordance with claim 1, wherein when the electromechanical actuator is operated, and energy is stored in the capacitors.

15. The method according to claim 14, wherein the energy being stored as electrical energy is stored in supercapacitors of the control and drive electronics.

\* \* \* \* \*